United States Patent
Lu et al.

(10) Patent No.: US 11,169,702 B2
(45) Date of Patent: Nov. 9, 2021

(54) METHOD AND DEVICE FOR DISPLAYING INFORMATION AND STORAGE MEDIUM

(71) Applicant: BEIJING XIAOMI MOBILE SOFTWARE CO., LTD., Beijing (CN)

(72) Inventors: Yizhan Lu, Beijing (CN); Hong Lu, Beijing (CN); Yaoluo Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/689,063

(22) Filed: Nov. 19, 2019

(65) Prior Publication Data
US 2020/0341633 A1    Oct. 29, 2020

(30) Foreign Application Priority Data

Apr. 25, 2019  (CN) .......................... 201910340647.1

(51) Int. Cl.
| | |
|---|---|
| *G06F 3/048* | (2013.01) |
| *G06F 3/0488* | (2013.01) |
| *G06F 3/0481* | (2013.01) |
| *G06F 3/0484* | (2013.01) |
| *H04M 1/72448* | (2021.01) |
| *H04M 1/72469* | (2021.01) |
| *G06F 3/01* | (2006.01) |

(52) U.S. Cl.
CPC ........ *G06F 3/04886* (2013.01); *G06F 3/0484* (2013.01); *G06F 3/04812* (2013.01); *H04M 1/72448* (2021.01); *H04M 1/72469* (2021.01)

(58) Field of Classification Search
CPC ..................................................... G06F 3/0482
See application file for complete search history.

(56) References Cited

U.S. PATENT DOCUMENTS

| | | | |
|---|---|---|---|
| 6,144,378 A * | 11/2000 | Lee ........................ | G06F 3/0236 715/767 |
| 6,549,219 B2 * | 4/2003 | Selker ................... | G06F 3/0482 345/902 |

(Continued)

FOREIGN PATENT DOCUMENTS

| | | |
|---|---|---|
| CN | 107239278 A | 10/2017 |
| CN | 109246464 A | 1/2019 |

(Continued)

OTHER PUBLICATIONS

Supplementary European Search Report in the European application No. 19211348.8, dated Jun. 12, 2020.

*Primary Examiner* — Nicholas Augustine
(74) *Attorney, Agent, or Firm* — Syncoda LLC; Feng Ma

(57) ABSTRACT

A method for displaying information includes: first application information of a second application is acquired in a process of displaying a present interface of a first application; and a floating window of the second application is generated according to the first application information of the second application, the floating window of the second application being used to display the first application information of the second application. As such, coordinated work between applications may be achieved, a user does not needed to switch two types of applications and can always get running statuses of the applications.

20 Claims, 20 Drawing Sheets

(56) References Cited

U.S. PATENT DOCUMENTS

| | | | | |
|---|---|---|---|---|
| 7,992,102 B1* | 8/2011 | De Angelo | G06F 3/04886 | 715/834 |
| 8,832,190 B1* | 9/2014 | Leske | G06Q 10/107 | 709/204 |
| 9,477,374 B1* | 10/2016 | Snabl | G06F 3/04817 | |
| 9,754,025 B2* | 9/2017 | Roswell | H04L 12/1813 | |
| 2004/0233238 A1* | 11/2004 | Lahdesmaki | H04N 21/4312 | 715/810 |
| 2005/0192924 A1* | 9/2005 | Drucker | G06F 16/58 | |
| 2006/0048076 A1* | 3/2006 | Vronay | G06F 16/904 | 715/850 |
| 2007/0033220 A1* | 2/2007 | Drucker | G06F 16/48 | |
| 2007/0180392 A1* | 8/2007 | Russo | G06F 3/0482 | 715/765 |
| 2009/0214034 A1* | 8/2009 | Mehrotra | H04L 51/063 | 380/255 |
| 2010/0229130 A1* | 9/2010 | Edge | G06F 3/04883 | 715/863 |
| 2010/0293475 A1* | 11/2010 | Nottingham | H04L 51/34 | 715/752 |
| 2011/0271230 A1* | 11/2011 | Harris | G06F 3/0482 | 715/810 |
| 2012/0124520 A1* | 5/2012 | Samp | G06F 3/04886 | 715/834 |
| 2012/0324017 A1* | 12/2012 | Bellomo | G06Q 10/10 | 709/205 |
| 2013/0014006 A1* | 1/2013 | Abellera | G06F 3/0482 | 715/234 |
| 2013/0019174 A1* | 1/2013 | Gil | G06F 3/04812 | 715/711 |
| 2014/0052538 A1* | 2/2014 | Foote | G06Q 50/01 | 705/14.66 |
| 2015/0033149 A1* | 1/2015 | Kuchoor | G06F 3/0481 | 715/753 |
| 2016/0334943 A1* | 11/2016 | Jeon | G06F 3/04845 | |
| 2017/0149959 A1* | 5/2017 | Shin | G06F 3/0488 | |
| 2017/0300211 A1 | 10/2017 | Wang et al. | | |
| 2017/0315681 A1 | 11/2017 | Kang et al. | | |
| 2018/0253538 A1* | 9/2018 | Lin | G06F 21/31 | |
| 2018/0307390 A1* | 10/2018 | Fang | G06F 3/0483 | |
| 2020/0142552 A1* | 5/2020 | Borkar | H04L 67/22 | |

FOREIGN PATENT DOCUMENTS

| | | |
|---|---|---|
| EP | 3232323 A1 | 10/2017 |
| EP | 3242203 A1 | 11/2017 |

* cited by examiner

METHOD AND DEVICE FOR DISPLAYING INFORMATION AND STORAGE MEDIUM

CROSS-REFERENCE TO RELATED APPLICATION

This application claims priority to Chinese patent application No. 201910340647.1 filed on Apr. 25, 2019, the disclosure of which is hereby incorporated by reference in its entirety.

BACKGROUND

Users depend more and more on two types of applications in the mobile Internet industry: a content-type application, and a service-type application. A content-type application is a content-based application. A content-type application is for a user to acquire information anytime anywhere, which enriches the knowledge of the user and is favorable for the user to know about current events. Content-type applications include applications having rich contents such as literature information type applications, video type applications, learning type applications, etc. For example, applications such as TouTiao and Weibo are content-type applications. A service-type application is a service-based application. A service-type application is for satisfying life demands of a user in daily food, clothing, shelters, transportation, and etc., which contributes to a better life experience of the user and brings more convenience to the life of the user. A service-type application may provide classified local information for the user, such as discounts, packages and group purchase, which is closely related to food, clothing, shelters and transportation in daily life of the user. For example, Meituan and Didi are service-type applications.

SUMMARY

The present disclosure generally relates to an information processing technology, and more particularly, to a method and device for displaying information and a storage medium.

According to a first aspect of embodiments of the present disclosure, a method for displaying information can include that:

first application information of a second application is acquired in a process of displaying a present interface of a first application; and a floating window of the second application is generated according to the first application information of the second application, the floating window of the second application being for displaying the first application information of the second application.

According to a second aspect of the embodiments of the present disclosure, a device for displaying information is provided, which can include:

a processor; and a memory configured to store an instruction executable for the processor, wherein the processor can be configured to:

acquire first application information of a second application in a process of displaying a present interface of a first application; and generate a floating window of the second application according to the first application information of the second application, the floating window of the second application being for displaying the first application information of the second application.

According to a third aspect of the embodiments of the present disclosure, a non-transitory computer-readable storage medium has stored an instruction which when executed by a processor of a mobile terminal, enables the mobile terminal to execute any information display method in the first aspect.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
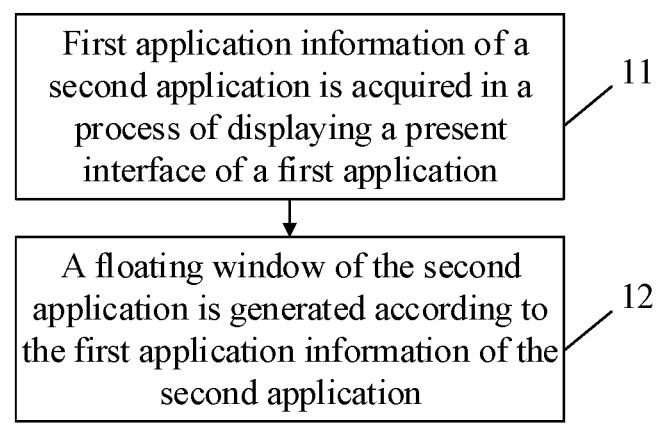
FIG. 1 is a first flowchart of a method for displaying information according to some embodiments.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the disclosure are for the purpose of describing specific embodiments only, and are not intended to limit the disclosure. The singular forms "a" "the" and "this" used in the disclosure and the appended claims may also include plural forms unless the contexts clearly indicate other meanings. It should also be understood that the term "and/or" used herein refers to and includes any and all possible combinations of one or more of associated listed items.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The content-type applications and service-type applications have been applied extensively, but the two types of applications are mutually independent, which have fewer beneficial relations but only some unfavorable influence. For example, in a case that a content-type application is a video application and that a service-type application is a takeout application, when it is time for a user to call for a takeout, the user may forget to call while watching a video on the video application; or the user, after calling for the takeout, has to constantly pay attention to a situation of the takeout order and thus cannot watching the video comfortably or smoothly.

In some examples, related service of some service-type applications may be inserted into an information flow of content of a content-type application, and then a user may enjoy both the content of the content-type application and the service recommended by the service-type applications. For example, in a case that a user is reading news on the content-type application, the user may be recommended with a takeout application when it is time to have lunch; the recommended takeout application may be inserted into the news, and thus once the user clicks the inserted takeout application, the terminal may jump to the takeout application to provide service related to calling for a takeout. For another example, in a case that a user is reading news on a content-type application, a taxi application may be recommended to the user when it is time for the user to leave the office; the recommended taxi application is inserted into the news, so that once the user clicks the inserted taxi application, the terminal may jump to the taxi application to provide service related to taking a taxi.

Inserting related service of some service-type applications into an information flow of content of a content-type application may make a user not forget to use the service-type applications when using the content-type application to some extent, but has the following problems and makes user experience degraded:

1) frequent switching is required between the two types of applications; and 2) an execution status of the service in the service-type applications may not be got anytime during switching; for example, the user, after calling for a takeout on the takeout application, switches back to the news application to read the news and thus cannot get status information of the takeout timely when reading the news.

FIG. 1 is a first flowchart of a method for displaying information according to some embodiments. As shown in FIG. 1, the method includes the following operations.

In operation 11, first application information of a second application is acquired in a process of displaying a present interface of a first application.

It is to be noted that a terminal can acquire the first application information of the second application in real time in the process of displaying the present interface of the first application. The first application information can be service status information of the second application, i.e., service information generated in the second application. For example, when the first application is a video application and the second application is a takeout application, if a user has purchased takeout service on the takeout application, namely a takeout order has been generated in the takeout application, then the first application information is status information of the takeout order of the takeout application, and when the user is watching a video, the terminal can acquire the status information of the takeout order from the takeout application in real time.

In operation 12, a floating window of the second application is generated according to the first application information of the second application, the floating window of the second application being used to display the first application information of the second application.

It is to be noted that the floating window is a small window displayed on an interface of the terminal and is configured to display information, like a small bubble appearing on the interface of the terminal. After the first application information of the second application is acquired, the floating window of the second application can be generated according to the first application information, so that the first application information of the second application can be displayed in the process of displaying the present interface of the first application. For example, in a case that the first application is a video application and that the second application is a takeout application, the first application information is status information of a takeout order of the takeout application, and when the user is watching a video, the terminal displays a floating window on the interface of the video application for presenting the status information of the takeout order acquired in real time from the takeout application.

Through the method in the embodiment, the first application information of the second application can be displayed through the floating window of the second application in the process of displaying the present interface of the first application, so that coordinated work between the two applications can be implemented, the user is not needed to switch the two types of applications frequently and can always get running statuses of the applications, and user experience is improved.

Figure 2:
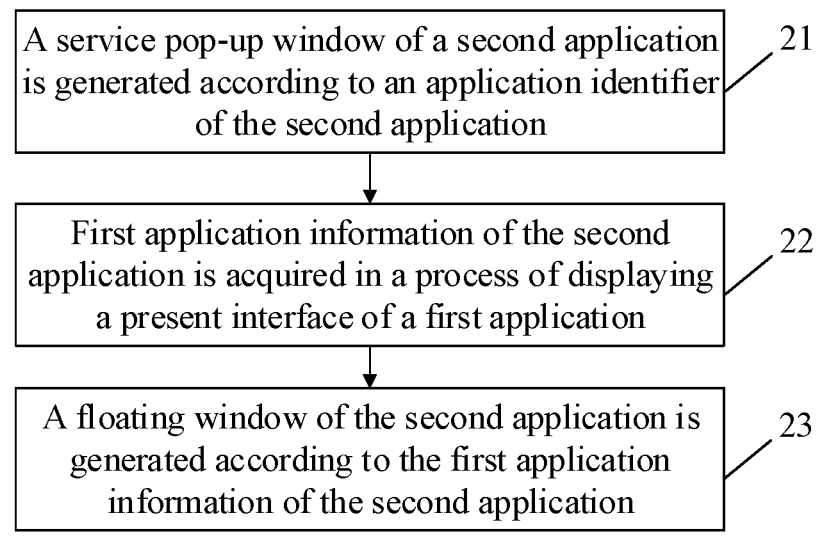
FIG. 2 is a second flowchart of a method for displaying information according to some embodiments.

FIG. 2 is a second flowchart of a method for displaying information according to some embodiments. As shown in FIG. 2, the method includes the following operations.

In operation 21, a service pop-up window of a second application is generated according to an application identifier of the second application, the service pop-up window being used to display service to be confirmed in the second application.

It is to be noted that the pop-up window is a window displayed in a pop-up manner on an interface of a terminal and is configured to display information. Before first application information of the second application is acquired in a process of displaying a present interface of a first application, the terminal can acquire the application identifier of the second application by interaction with a server based on a preset logic, the application identifier being used to uniquely identify the second application; the terminal can acquire the second application according to the acquired application identifier of the second application, acquire the service to be confirmed in the second application based on the second application, wherein the service to be confirmed in the second application can be service, used by a user last time, of the second application; and the terminal can generate the service pop-up window to display the service to be confirmed in the second application. For example, in a case that the first application is a video application and that the second application is a takeout application, if a user does not purchase takeout service on the takeout application, namely a takeout order has not yet been generated in the takeout application, then, when the user is watching a video, the terminal can acquire a last takeout order of the user from the takeout application, generate a takeout order to be confirmed according to the last takeout order of the user and display the takeout order to be confirmed through a service pop-up window.

In operation 22, first application information of the second application is acquired in a process of displaying a present interface of a first application.

In operation 23, a floating window of the second application is generated according to the first application information of the second application, the floating window of the second application being used to display the first application information of the second application.

It is to be noted that, after the service pop-up window of the second application is generated according to the acquired application identifier of the second application, the user can determine service to be confirmed through a trigger operation, for example, determining the service to be confirmed by clicking the service pop-up window, or can determine service to be confirmed without any trigger operation within a preset duration. After the service is confirmed, the first application information of the second application can be acquired, and the first application information can be status information of service of the second application. Status information of the confirmed takeout order can be displayed through the floating window of the second application. For example, in a case that the first application is a video application and that the second application is a takeout application, the first application information is status information of a takeout order of the takeout application, the service pop-up window for presenting the takeout order to be confirmed can be displayed when the user is watching the video, and when the user confirms the takeout order, the status information of the confirmed takeout order can be acquired, and the floating window for presenting the status information of the confirmed takeout order is displayed.

The operation 21 is an implementation of the operation that the service pop-up window of the second application is generated.

Through the method in the embodiment, the service pop-up window for presenting the service to be confirmed in the second application can be displayed in the process of displaying the present interface of the first application, and after the service is confirmed through the service pop-up window, the first application information of the second application can be displayed through the floating window of the second application, so that coordinated work between applications can be implemented, the user is not required to switch the two types of applications, so that the user can always get running statuses of the applications and user experience is improved.

Figure 3:
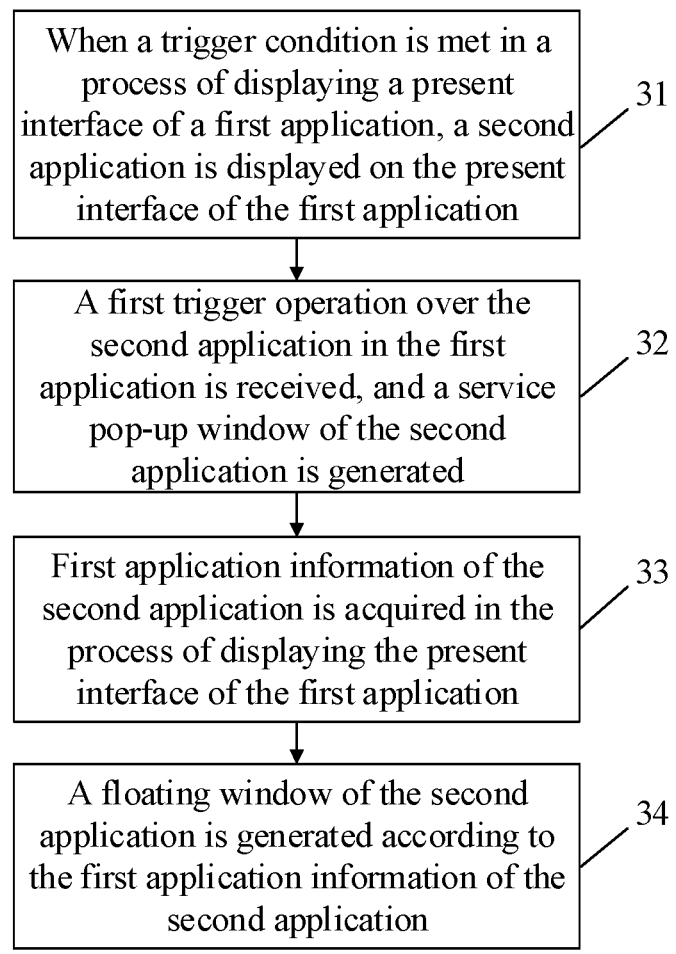
FIG. 3 is a third flowchart of a method for displaying information according to some embodiments.

FIG. 3 is a third flowchart of a method for displaying information according to some embodiments. As shown in FIG. 3, the method includes the following operations.

In operation 31, when a trigger condition is met in a process of displaying a present interface of a first application, a second application is displayed on the present interface of the first application.

It is to be noted that first information can be acquired in the process of displaying the present interface of the first application, the second application can be acquired when the first information reaches the trigger condition, and the second application can be displayed on the present interface of the first application. The first information can be present time or can be a present position of a terminal. For example, in a case that the first application is a news application, the second application is a takeout application and that the first information is present time, when a user is reading news, the terminal can acquire the present time in real time and, when the present time reaches a preset time, for example, lunch time, the terminal can display the takeout application on a news interface.

The terminal can create a display pattern for the second application according to a preset interface protocol and display the second application on the interface of the first application according to a preset display rule. For example, the second application can be displayed at a top or bottom of the interface of the first application in such a display pattern as a card or an icon or a list, etc. Elements of the card can include a picture, a name, a text content, a label/topic, time and the like, which can present rich contents usually accompanied with pictures, occupy a relatively large area of a screen, and thus bring better reading experience to a user. The list is commonly used for such types of applications as news, reading and chatting, which has information elements including a picture, a title/name, a summary/introduction, a label/topic, time and the like. The number of information flows of the list can be large, and a user needs to rapidly browse the title, the summary, a prompt text and the like to determine whether to click for details.

Figure 9:
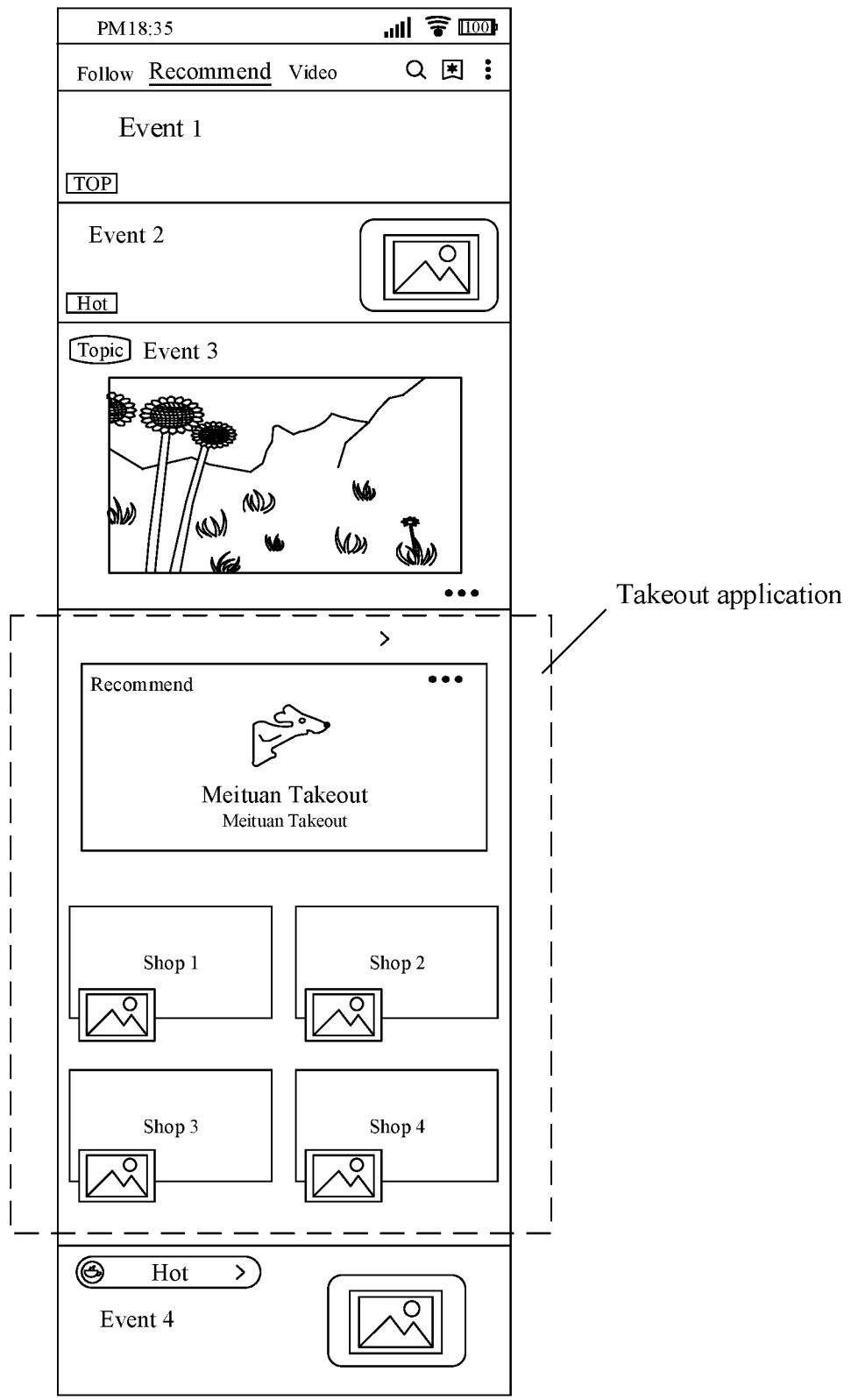
FIG. 9 is a first diagram of an application interface according to some embodiments.

As shown in FIG. 9, the first application is a news application, the second application is a takeout application, the news application can display information flows in the list form or the card form, and the takeout application can be displayed on the interface of the news application in the card form.

In operation 32, a first trigger operation over the second application is received on the first application, and a service pop-up window of the second application is generated, the service pop-up window being used to display service to be confirmed in the second application.

It is to be noted that the first trigger operation can be a user operation such as a click and a swipe, and the terminal can define a clicking event for content lists appearing on the interface. After the second application is displayed on the interface of the first application, the terminal can monitor an operation of clicking the second application on the interface based on a monitoring program. The terminal, after detecting the operation of clicking the second application, can acquire service, used by the user, in the second application through interaction with a server according to a preset logic, and generate the service pop-up window of the second application based on the service. The user can further change the service to be confirmed, displayed in the service pop-up window, on the second application according to a requirement. The service pop-up window can be a lightweight pop-up window, and the lightweight pop-up window has a high running speed, is independent from a terminal environment and is applicable to various terminals. The service pop-up window can be a window displayed on an interface of the terminal in a pop-up manner and is configured to display information.

Figure 10:
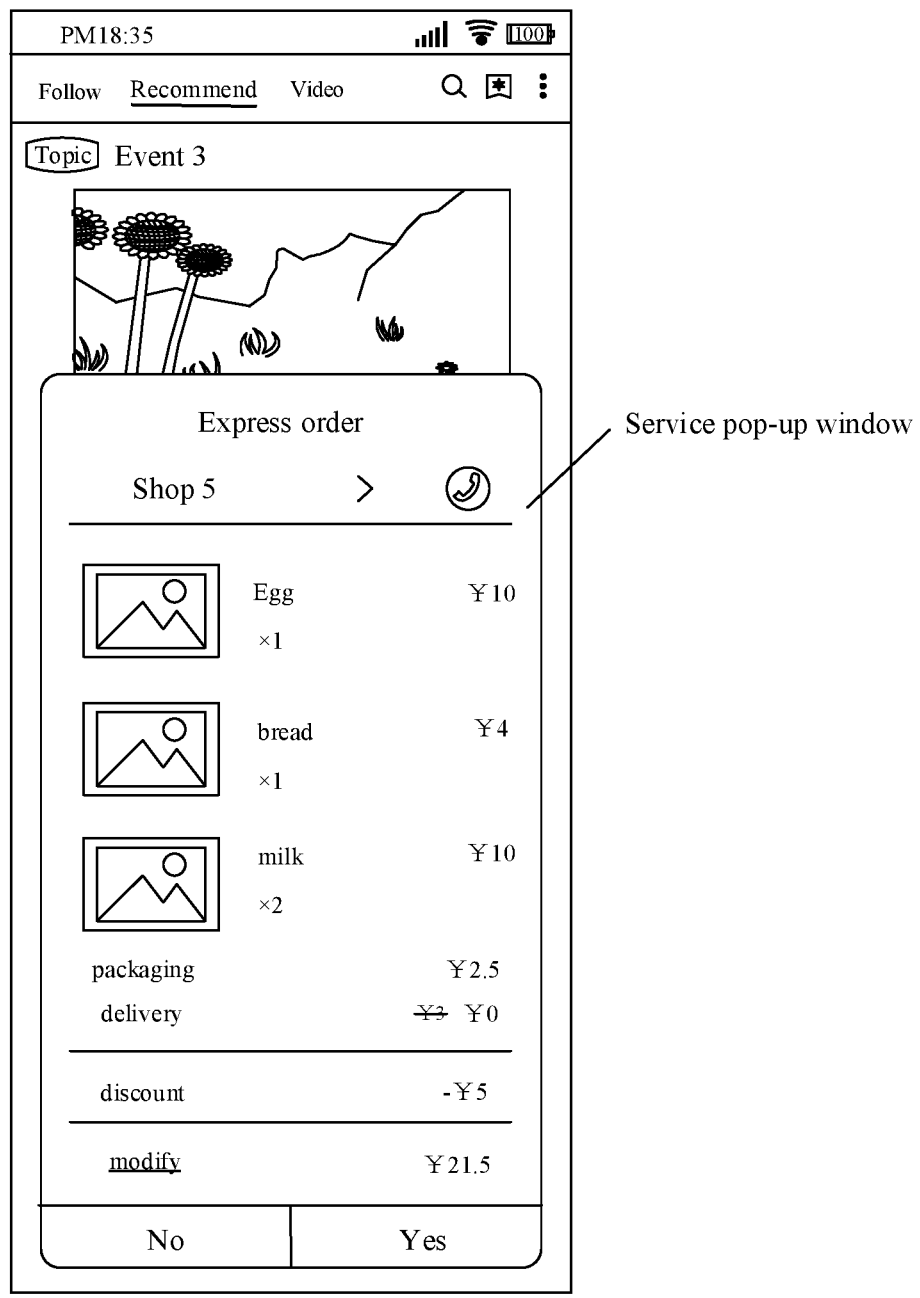
FIG. 10 is a second diagram of an application interface according to some embodiments.

For example, as shown in FIG. 10, in a case that the first application is a news application and the second application is a takeout application, when a user clicks a takeout application card while reading news, the terminal can detect the operation of clicking the takeout application based on a monitoring program and generate a service pop-up window for selecting a takeout, the service pop-up window including a takeout order to be confirmed. In addition, the user can change the service to be confirmed based on the service pop-up window, for example, modifying the generated takeout order to be confirmed.

In operation 33, first application information of the second application is acquired in the process of displaying the present interface of the first application.

In operation 34, a floating window of the second application is generated according to the first application information of the second application, the floating window of the second application being used to display the first application information of the second application.

The operation 31 and operation 32 are implementations of the operation that the second application is displayed on the present interface of the first application and the service pop-up window of the second application is generated through the first trigger operation over the second application.

Through the method in the embodiment, the second application can be displayed on the present interface of the first application, the service pop-up window for presenting the service to be confirmed in the second application can be generated through the first trigger operation over the second application, and after the service is confirmed through the service pop-up window, the first application information of the second application can be displayed through the floating window of the second application, so that coordinated work between applications can be implemented, the user is not required to switch the two types of applications and can always get running statuses of the applications, and thus user experience is improved.

Figure 4:
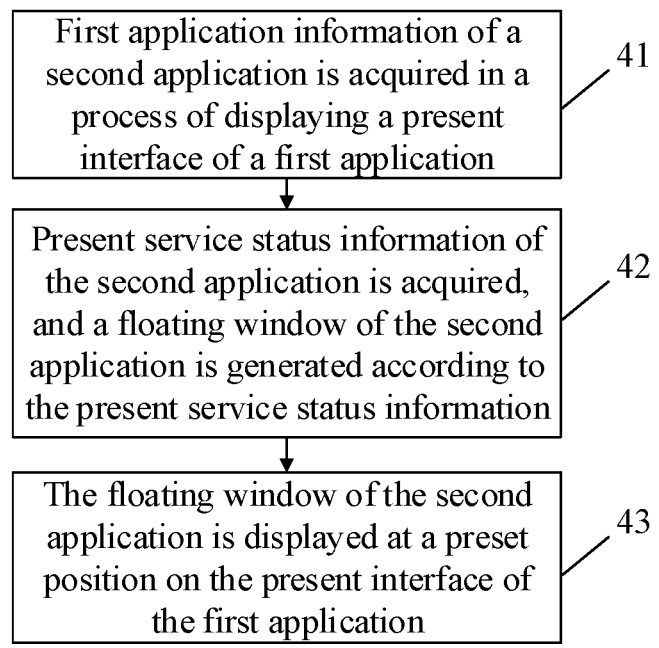
FIG. 4 is a fourth flowchart of a method for displaying information according to some embodiments.

FIG. 4 is a fourth flowchart of a method for displaying information according to some embodiments. As shown in FIG. 4, the method includes the following operations.

In operation 41, first application information of a second application is acquired in a process of displaying a present interface of a first application.

In operation 42, present service status information of the second application is acquired, and a floating window of the second application is generated according to the present service status information.

In operation 43, the floating window of the second application is displayed at a preset position on the present interface of the first application.

The operation 42 and operation 43 are implementations of the operation 12 that the floating window of the second application is generated.

It is to be noted that the first application information in operation 41 is service status information. After the service status information of the second application is obtained in the process of displaying the present interface of the first application, the present service status information of the second application can be acquired, the floating window for displaying the present service status information can be generated, and the floating window of the second application can be displayed at the preset position on the present interface of the first application.

The floating window can be a view element, which can be displayed on another view element; the floating window can be a small window displayed on an interface of a terminal and configured to display information, like a small bubble appearing on the interface of the terminal. The floating window can occupy a small area of the interface of the terminal. The floating window can be kept displayed on the interface of the terminal without influence on operations of a user and is favorable for the user to acquire the information displayed in the floating window anytime. The floating window can be displayed at any position on the interface. In the embodiment, the floating window can float at an edge of the interface of the first application.

Figure 11:
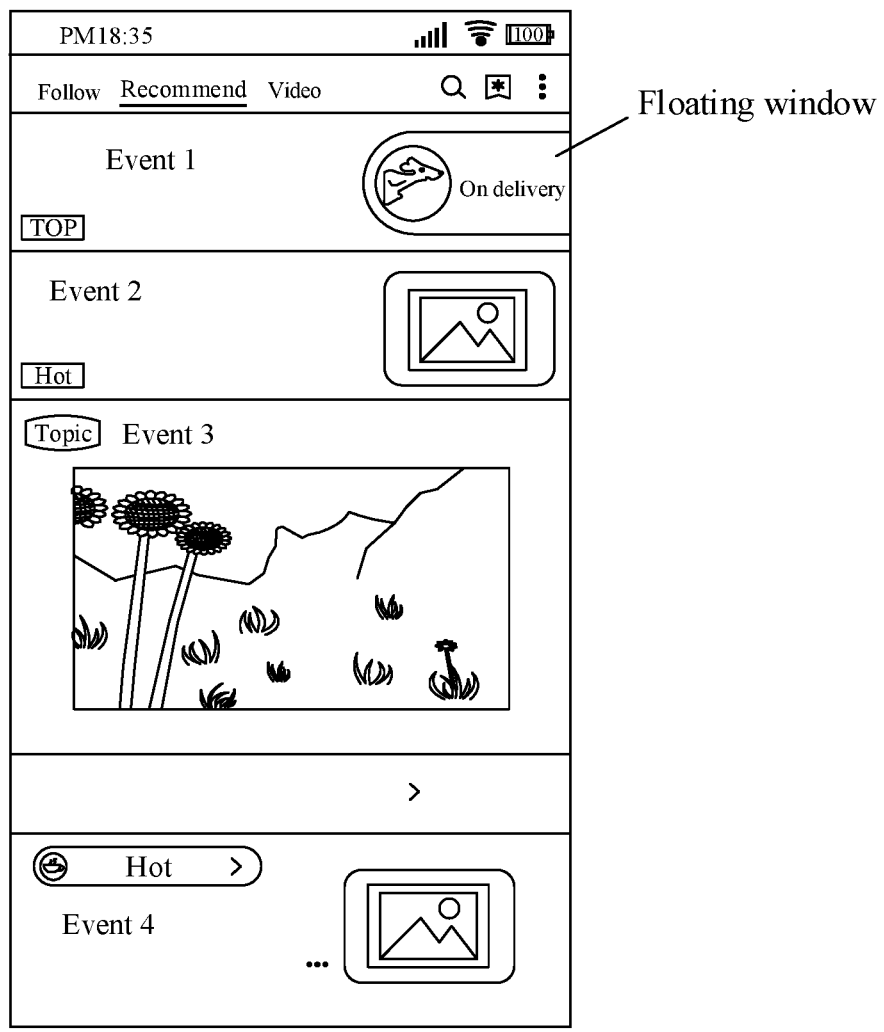
FIG. 11 is a third diagram of an application interface according to some embodiments.

As shown in FIG. 11, in a case that the first application is a news application and that the second application is a takeout application, a present distribution status of a takeout order, for example, reception by a merchant, pickup by a deliveryman and delivery of the deliveryman, can be acquired when the user is reading news, the floating window can be displayed at an edge of an interface of the news application to present the distribution status of the present takeout order.

Through the method in the embodiment, status information of service of the second application can be displayed through the floating window of the second application in the process of displaying the present interface of the first application, so that coordinated work between applications can be implemented, a user is not required to switch two types of applications and can always get running statuses of the applications, and thus user experience is improved.

Figure 5:
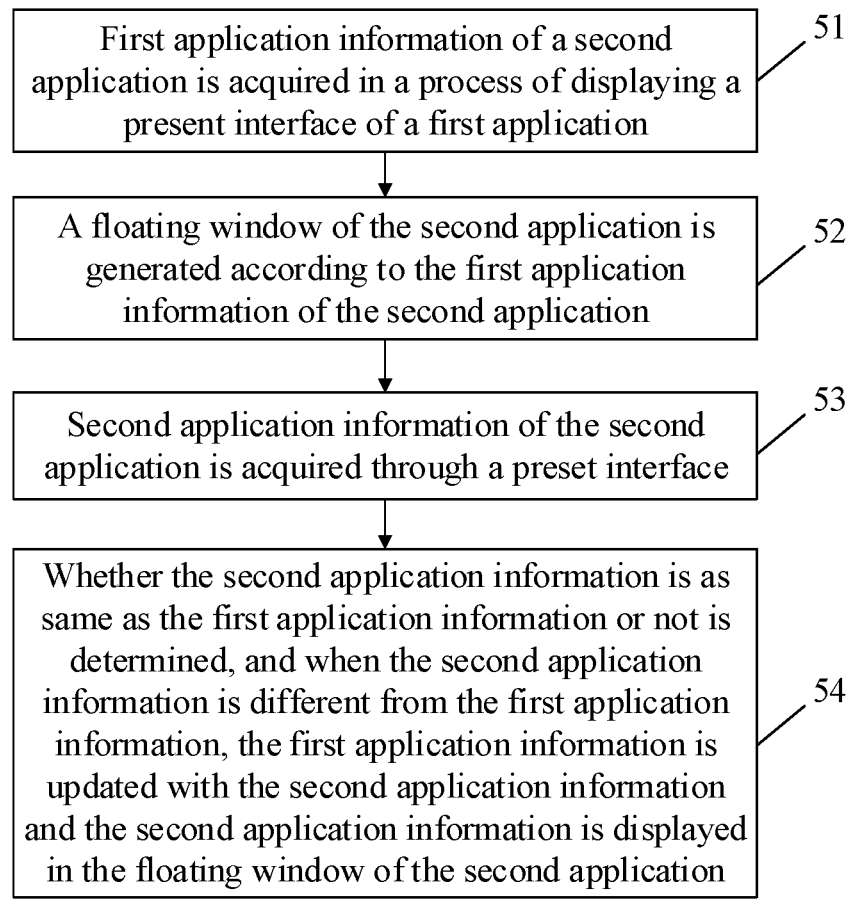
FIG. 5 is a fifth flowchart of a method for displaying information according to some embodiments.

FIG. 5 is a fifth flowchart of a method for displaying information according to some embodiments. As shown in FIG. 5, the method includes the following operations.

In operation 51, first application information of a second application is acquired in a process of displaying a present interface of a first application.

In operation 52, a floating window of the second application is generated according to the first application information of the second application, the floating window of the second application being used to display the first application information of the second application.

In operation 53, second application information of the second application is acquired through a preset interface.

It is to be noted that a terminal can acquire an interface of the second application to connect with the second application through the interface, and acquire application information of the second application in real time based on a thread. The first application information and the second application information can be real-time service status information of the second application, namely the first application information is service status information at a previous moment and the second application information is present service status information.

In operation 54, whether the second application information is as same as the first application information or not is determined, and when the second application information is different from the first application information, the first application information is updated with the second application information and the second application information is displayed in the floating window of the second application.

It is to be noted that, after the second application information of the second application is acquired, the second application information of the second application is compared with the first application information at a previous moment and, when the second application information is different from the first application information, it is indicated that the present information has changed, and then the second application information can be displayed instead of the first application information in the floating window of the second application. For example, if the application information is a distribution status of a takeout order, the first application information is reception by a merchant and the second application information is pickup by a deliveryman, then it is indicated that the distribution status of the takeout order has changed, and reception by the merchant, displayed in the floating window, can be updated into pickup by the deliveryman.

The operation 53 and operation 54 are implementations of the operation that the first application information is updated with the second application information and the second application information is displayed in the floating window of the second application.

Through the method in the embodiment, the service status information of the second application can be displayed in real time through the floating window of the second application in the process of displaying the present interface of the first application, so that coordinated work between applications can be implemented, a user is not needed to switch two types of applications and can always get running statuses of the applications, and thus user experience is improved.

Figure 6:
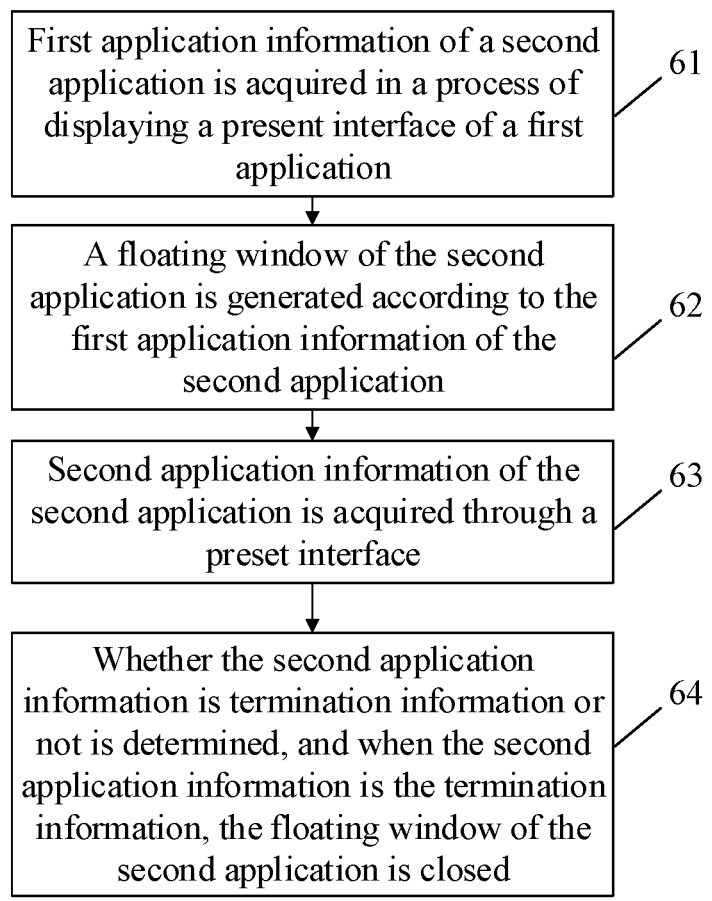
FIG. 6 is a sixth flowchart of a method for displaying information according to some embodiments.

FIG. 6 is a sixth flowchart of a method for displaying information according to some embodiments. As shown in FIG. 6, the method includes the following operations.

In operation 61, first application information of a second application is acquired in a process of displaying a present interface of a first application.

In operation 62, a floating window of the second application is generated according to the first application information of the second application, the floating window of the second application being used to display the first application information of the second application.

In operation 63, second application information of the second application is acquired through a preset interface.

In operation 64, whether the second application information is termination information or not is determined, and when the second application information is the termination information, the floating window of the second application is closed.

It is to be noted that the termination information can be service status information for instructing the floating window of the second application to exit, namely it is indicated that service has been completed. After the second application information of the second application is acquired, the second application information can be compared with the termination information. When the second application information is as same as the termination information, it is indicated that the floating window of the second application is required to be closed, and the floating window of the second application can be closed. When the second application information is different from the termination information, it is indicated that the floating window of the second application is not required to be closed, and the floating window of the second application can be updated with the second application information and display the same. For example, if application information is a distribution status of a takeout order, the first application information is reception by a merchant, the second application information is successful delivery of the order and the termination information is successful delivery of the order, the second application information is as same as the termination information, it is indicated that the takeout order has been completed, and the floating window of the second application can be closed.

The operation 63 and operation 64 are implementations of the operation that the floating window of the second application is closed.

Through the method in the embodiment, the service status information of the second application can be displayed in real time through the floating window of the second application in the process of displaying the present interface of the first application, so that coordinated work between applications can be implemented, the user is not needed to switch two types of applications and can always get running statuses of the applications, and thus user experience is improved.

Figure 7:
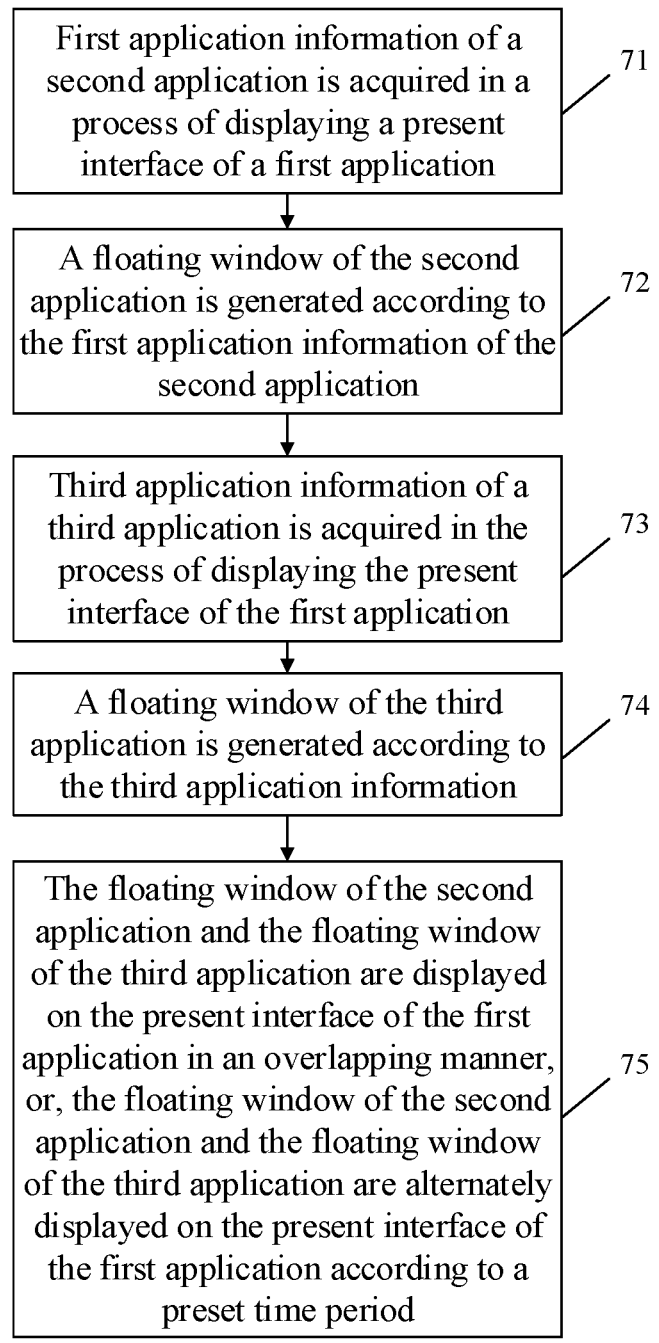
FIG. 7 is a seventh flowchart of a method for displaying information according to some embodiments.

FIG. 7 is a seventh flowchart of a method for displaying information according to some embodiments. As shown in FIG. 7, the method includes the following operations.

In operation 71, first application information of a second application is acquired in a process of displaying a present interface of a first application.

In operation 72, a floating window of the second application is generated according to the first application information of the second application, the floating window of the second application being used to display the first application information of the second application.

In operation 73, third application information of a third application is acquired in the process of displaying the present interface of the first application.

It is to be noted that a terminal can further acquire third application information of a third application in real time in the process of displaying the present interface of the first application. The third application information can be service status information of the third application, i.e., information of service generated in the third application.

In operation 74, a floating window of the third application is generated according to the third application information, the floating window of the third application being used to display the third application information of the third application.

It is to be noted that, after the third application information of the third application is acquired, the floating window of the third application can be generated according to the third application information, so that the third application information of the third application can be displayed in the process of displaying the present interface of the first application.

In operation 75, the floating window of the second application and the floating window of the third application are displayed on the present interface of the first application in an overlapping manner, or, the floating window of the second application and the floating window of the third application are alternately displayed on the present interface of the first application according to a preset time period.

It is to be noted that multiple manners can be adopted for displaying the floating window of the second application and the floating window of the third application on the present interface of the first application and can be set according to a requirement of a user. The floating window of the second application and the floating window of the third application can be displayed on the present interface of the first application in a overlapping manner, or the floating window of the second application and the floating window of the third application can be alternately displayed on the present interface of the first application according to a preset time period. For example, when the time period is 5 seconds, the floating window of the second application can be displayed on the interface of the first application within preset 5 seconds and the floating window of the third application can be displayed on the interface of the first application within next 5 seconds, namely the floating window of the second application and the floating window of the third application are alternately displayed by taking 5 seconds as a period.

The operations 73-75 are implementations of the operation that floating windows of other multiple applications are displayed on the interface of the first application.

Through the method in the embodiment, service status information of the second application and that of the third application can be displayed in real time through the floating windows in the process of displaying the present interface of the first application, so that coordinated work between applications can be implemented, the user is not required to switch two types of applications and can always get running statuses of the applications, and thus user experience is improved.

Figure 8:
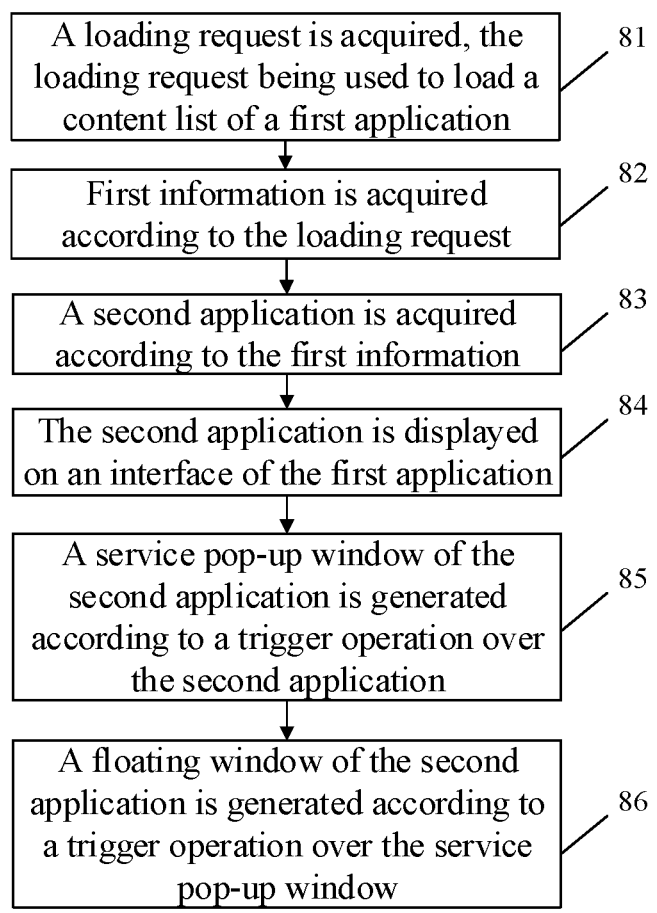
FIG. 8 is an eighth flowchart of a method for displaying information according to some embodiments.

FIG. 8 is an eighth flowchart of a method for displaying information according to some embodiments. As shown in FIG. 8, the information display method is applied to a terminal and includes the following operations.

In operation 81, a loading request is acquired, the loading request being used to load a content list of a first application.

It is to be noted that, as shown in FIG. 9, when a content of the first application is displayed on an interface of the terminal, a user can acquire the content through a swipe operation. The swipe operation can be an upward swipe operation in a touch region of the terminal. A server can set network data to be sent to the terminal every time according to a protocol with the terminal, the network data including a fixed number of content lists. Upon when the terminal detects that a user swipes the fixed number of content lists displayed on the interface a position close to a bottom of the interface of the terminal, it means that it is necessary to load other content of the application, then a loading request can be acquired and sent to the server. The server can send other network data with the fixed number of content lists to the terminal according to the loading request and the terminal, after receiving the other network data with the fixed number of content lists, can display the received fixed number of content lists on an interface of the first application. For example, in a case that the first application is a news application, that current news is displayed on the interface of the terminal and that a user swipes the interface upwards to read news, when 15 pieces of news are swiped till a position close to the bottom of the interface, a request of loading a news list can be acquired and sent to a server, the server can send other 15 pieces of news to the terminal according to the request of loading a news list, and the terminal, after receiving the other 15 pieces of news, can display the received other 15 pieces of news.

The terminal can be a mobile terminal, for example, a mobile terminal with a wireless communication capability such as a smart phone, or can be an immobile smart terminal with a wireless communication function, for example, a desktop computer.

In operation 82, first information is acquired according to the loading request, the first information being used to acquire a second application.

It is to be noted that the terminal, after acquiring the loading request, can acquire the first information according to the loading request. The first information can be present time, a present position of the terminal, or information of an application presently used by the terminal, etc. The terminal can acquire the present time based on a clock program, acquire the present position of the terminal through a positioning system and acquire the information of the presently used application based on a monitoring program.

In operation 83, the second application is acquired according to the first information.

It is to be noted that the terminal, after acquiring the first information, can acquire, according to a preset algorithm, the second application when the first information reaches a trigger condition. Specifically, the second application can be acquired when the first information is the present time and when the present time reaches a preset duration or a preset time. For example, when the present time is lunch time, a takeout application can be acquired, or when the present time is time when a user gets off work, a taxi application can be acquired. The second application can also be acquired when the first information is the present position of the terminal and the present position is a preset position. For example, when the present position is a bus stop, a bus stop query application such as real-time bus can be acquired. The second application can also be acquired according to a preset algorithm when the first information is related information of the first application of the terminal. For example, when the related information of the first application presently used by the terminal is game information, a game application (for example, Honor of Kings) can be acquired; and when the user is reading the game information through the news application, Honor of Kings can be acquired.

It is to be noted that the server, after receiving the loading request from the terminal, can acquire the second application according to the first information. The terminal can directly acquire the second application according to the first information without interaction with the server, so that time is saved, and an acquisition process is faster. The second application acquired by the server according to the first information can be more accurate and favorable for subsequent extension. For example, when a new application is developed, not every terminal is required to be updated with the new application. Whether the second application is acquired by a terminal or a server can specifically be set according to a practical requirement.

In operation 84, the second application is displayed on an interface of the first application.

It is to be noted that the terminal can create a display pattern for the second application according to a preset interface protocol and display the second application on the interface of the first application according to a preset display rule. For example, the second application can be displayed at a top or bottom of the interface of the first application in such a display pattern as in form of a card, or an icon or a list, etc.

As shown in FIG. 9, in a case that the first application is a news application, the second application is a takeout application and the news application displays information flows in a list form or a card form, the takeout application can be displayed on the interface of the news application in the card form.

In operation 85, a service pop-up window of the second application is generated according to a trigger operation over the second application, the service pop-up window being used to display service to be confirmed in the second application.

It is to be noted that the trigger operation can be a user operation such as a click and a swipe, and the terminal can define a clicking event for various content lists appearing on the interface. After the second application is displayed on the interface of the first application, the terminal can monitor an operation of clicking the second application on the interface based on a monitoring program. The terminal, after detecting the operation of clicking the second application, can acquire service used by the user from the second application by interaction with the server according to a preset logic and generate the service pop-up window of the second application according to the service.

For example, as shown in FIG. 10, when a user clicks a takeout application card while reading news, the terminal can detect the operation of clicking the takeout application based on a monitoring program and generate a service pop-up window for selecting a takeout, the service pop-up window including a takeout order to be confirmed.

In operation 86, a floating window of the second application is generated according to a trigger operation over the service pop-up window, the floating window of the second application being used to display a status of confirmed service of the second application.

It is to be noted that, after the service pop-up window is displayed on the interface of the first application, the terminal can monitor the operation of clicking the service pop-up window on the interface based on the monitoring program and, after the trigger operation over the service pop-up window is detected, namely the service is confirmed, the terminal can generate the floating window of the second application. In the embodiment, the floating window of the second application can be a window floating at an edge of the interface of the first application, and the floating window of the second application can display the status of the confirmed service anytime. The terminal can acquire an interface of the second application to connect with the second application through the interface, acquire the service status of the second application in real time based on a thread and display the service status in the floating window of the second application through a text or a graph. For example, as shown in FIG. 11, the second application is a takeout application, and when a user clicks an order to be confirmed displayed on the service pop-up window, the service pop-up window can disappear and a floating window floating at an edge of a screen can be generated, the floating window can display a distribution status of the presently confirmed takeout order, for example, reception by a merchant, pickup by a deliveryman and delivery of the deliveryman, so that the user can view a status of present service through the floating window anytime at the same time of reading news through the first application without leaving and switching the interface of the first application to an interface of the second application, and thus good user experience is provided. In addition, the user can also click the floating window to view detailed information of the confirmed service. When the status of the confirmed service changes, prompting information can be set. For example, the floating window can be enlarged and the enlarged floating window can be closed after a preset duration. When the confirmed service has been completed, the terminal may close the floating window. For example, once the takeout is delivered, the floating window displayed on the interface may disappear.

After the second application is displayed on the interface of the first application, the terminal, after detecting the trigger operation over the second application on the interface based on the monitoring program, may directly generate the floating window of the second application, so that a user may get the service status without triggering the second application, and user operations are simplified.

Figure 12:
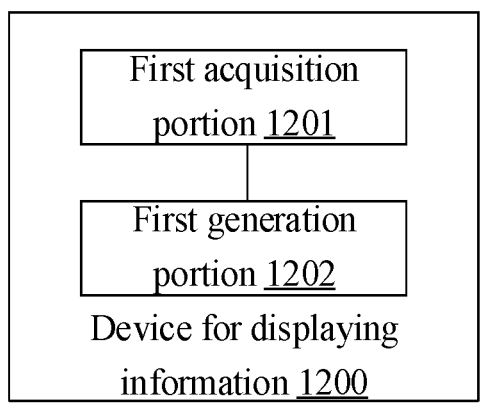
FIG. 12 is a block diagram of a device for displaying information according to some embodiments.

FIG. 12 is a block diagram of a device for displaying information 1200 according to some embodiments.

Referring to FIG. 12, the device 1200 includes a first acquisition portion 1201 and a first generation portion 1202.

The first acquisition portion 1201 is configured to acquire first application information of a second application in a process of displaying a present interface of a first application.

The first generation portion 1202 is configured to generate a floating window of the second application according to the first application information of the second application, the floating window of the second application being used to display the first application information of the second application.

Figure 13:
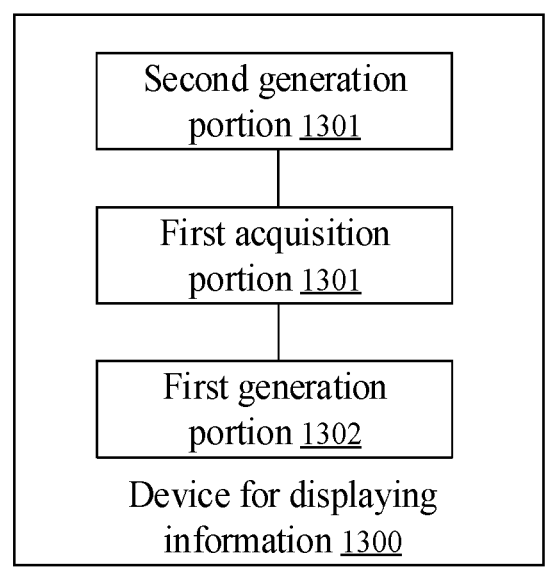
FIG. 13 is a block diagram of a device for displaying information according to some embodiments.

FIG. 13 is a block diagram of a device for displaying information 1300 according to some embodiments.

Referring to FIG. 13, the device 1300 includes a second acquisition portion 1301, a first acquisition portion 1302 and a first generation portion 1303

The second generation portion 1301 is configured to generate a service pop-up window of a second application according to an application identifier of the second application, the service pop-up window being used to display service to be confirmed in the second application.

The first acquisition portion 1302 and the first generation portion 1303 here are the same as the first acquisition portion 1201 and the first generation portion 1202 in FIG. 12. Detailed description is not repeated here.

Figure 14:
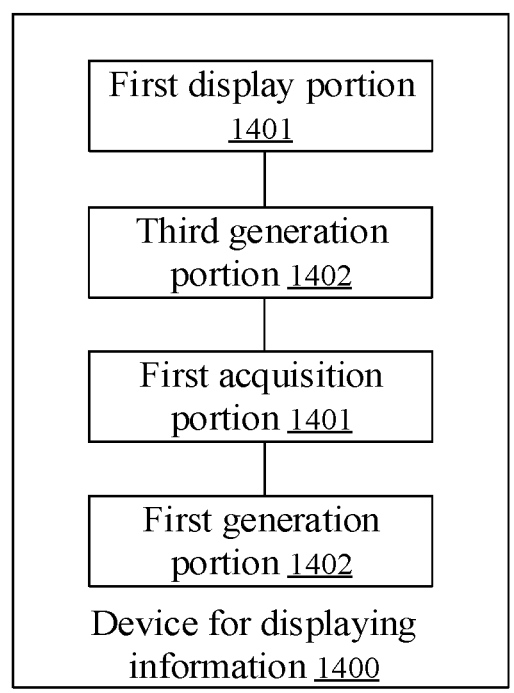
FIG. 14 is a block diagram of a device for displaying information according to some embodiments.

FIG. 14 is a block diagram of a device for displaying information 1400 according to some embodiments.

Referring to FIG. 14, the device 1400 includes a first display portion 1401, a third acquisition portion 1402, a first acquisition portion 1403 and a first generation portion 1404.

The first display portion 1401 is configured to, when a trigger condition is met in a process of displaying a present interface of a first application, display a second application on the present interface of the first application.

The third generation portion 1402 is configured to receive a first trigger operation over the second application in the first application and generate a service pop-up window of the second application, the service pop-up window being used to display service to be confirmed in the second application.

The first acquisition portion 1403 and the first generation portion 1404 here are the same as the first acquisition portion 1201 and the first generation portion 1202 in FIG. 12. Detailed description is not repeated here.

Figure 15:
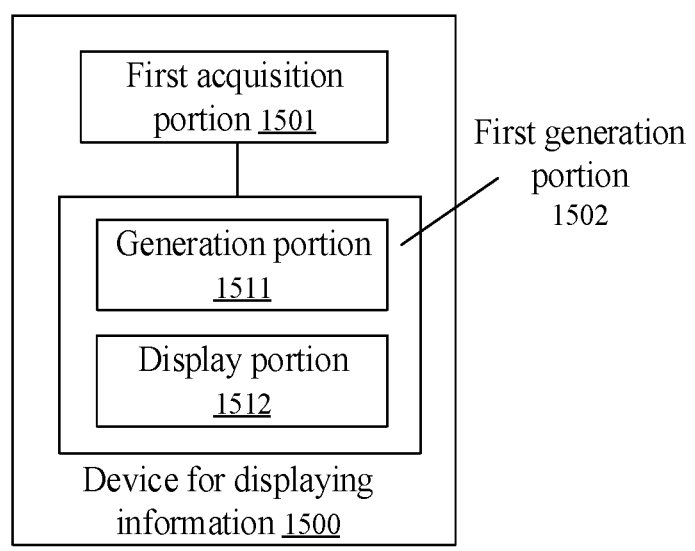
FIG. 15 is a block diagram of a device for displaying information according to some embodiments.

FIG. 15 is a block diagram of a device for displaying information 1500 according to some embodiments.

Referring to FIG. 15, the device 1500 includes a first acquisition portion 1501 and a first generation portion 1502. The first acquisition portion 1501 and the first generation portion 1502 here are the same as the first acquisition portion 1201 and the first generation portion 1202 in FIG. 12. Detailed description is not repeated herein. The first generation portion 1502 includes a generation portion 1511 and a display portion 1512.

The generation portion 1511 is configured to acquire present service status information of a second application and generate a floating window of the second application according to the present service status information.

The display portion 1512 is configured to display the floating window of the second application at a preset position on a present interface of a first application.

Figure 16:
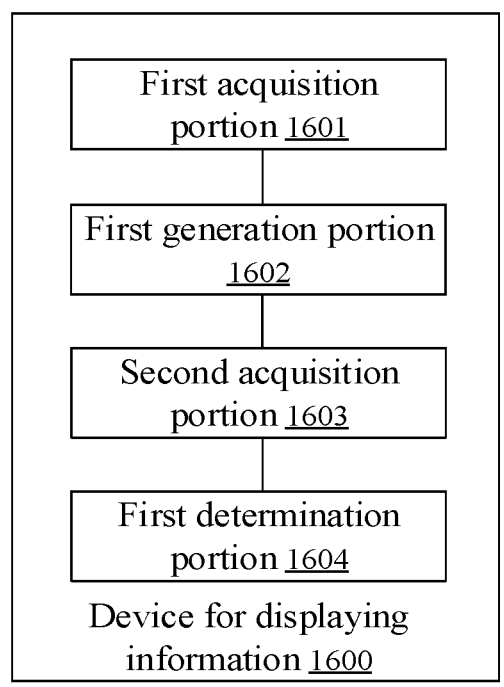
FIG. 16 is a block diagram of a device for displaying information according to some embodiments.

FIG. 16 is a block diagram of a device for displaying information 1600 according to some embodiments.

Referring to FIG. 16, the device 1600 includes a first acquisition portion 1601, a first generation portion 1602, a second acquisition portion 1603 and a first determination portion 1604. The first acquisition portion 1601 and the first generation portion 1602 here are the same as the first acquisition portion 1201 and the first generation portion 1202 in FIG. 12. Detailed description is not repeated here.

The second acquisition portion 1603 is configured to acquire second application information of a second application through a preset interface; and The first determination portion 1604 is configured to determine whether the second application information is as same as first application information or not and, when the second application information is different from the first application information, update and display the second application information in a floating window of the second application.

Figure 17:
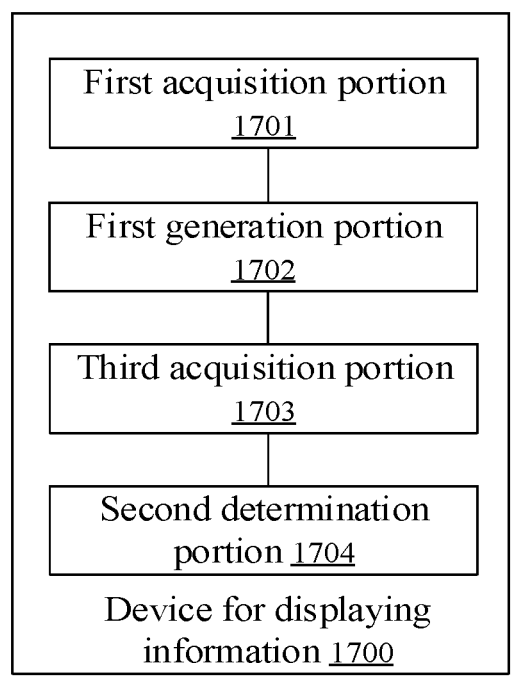
FIG. 17 is a block diagram of a device for displaying information according to some embodiments.

FIG. 17 is a block diagram of a device for displaying information 1700 according to some embodiments.

Referring to FIG. 17, the device 1700 includes a first acquisition portion 1701, a first generation portion 1702, a third acquisition portion 1703 and a second determination portion 1704. The first acquisition portion 1701 and the first generation portion 1702 here are the same as the first acquisition portion 1201 and the first generation portion 1202 in FIG. 12. Detailed description is not repeated here.

The third acquisition portion 1703 is configured to acquire second application information of a second application through a preset interface.

The second determination portion 1704 is configured to determine whether the second application information is termination information or not and, when the second application information is the termination information, close a floating window of the second application.

Figure 18:
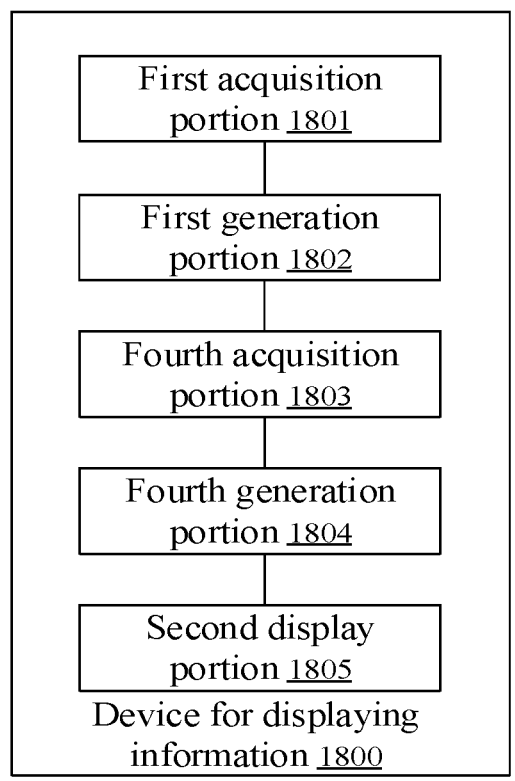
FIG. 18 is a block diagram of a device for displaying information according to some embodiments.

FIG. 18 is a block diagram of a device for displaying information 1800 according to some embodiments.

Referring to FIG. 18, the device 1800 includes a first acquisition portion 1801, a first generation portion 1802, a fourth acquisition portion 1804, a fourth generation portion 1804 and a second display portion 1805. The first acquisition portion 1801 and the first generation portion 1802 here are the same as the first acquisition portion 1201 and the first generation portion 1202 in FIG. 12. Detailed description is not repeated here.

The fourth acquisition portion 1803 is configured to acquire third application information of a third application in a process of displaying a present interface of a first application.

The fourth generation portion 1804 is configured to generate a floating window of the third application according to the third application information, the floating window of the third application being used to display the third application information of the third application.

The second display portion 1805 is configured to display a floating window of a second application and the floating window of the third application on the present interface of the first application in an overlapping manner, or, alternately display the floating window of the second application and the floating window of the third application on the present interface of the first application according to a preset time period.

With respect to the devices in the above embodiments, the specific manners for performing operations for individual portions therein have been described in detail in the embodiment regarding the method, which will not be elaborated herein.

Figure 19:
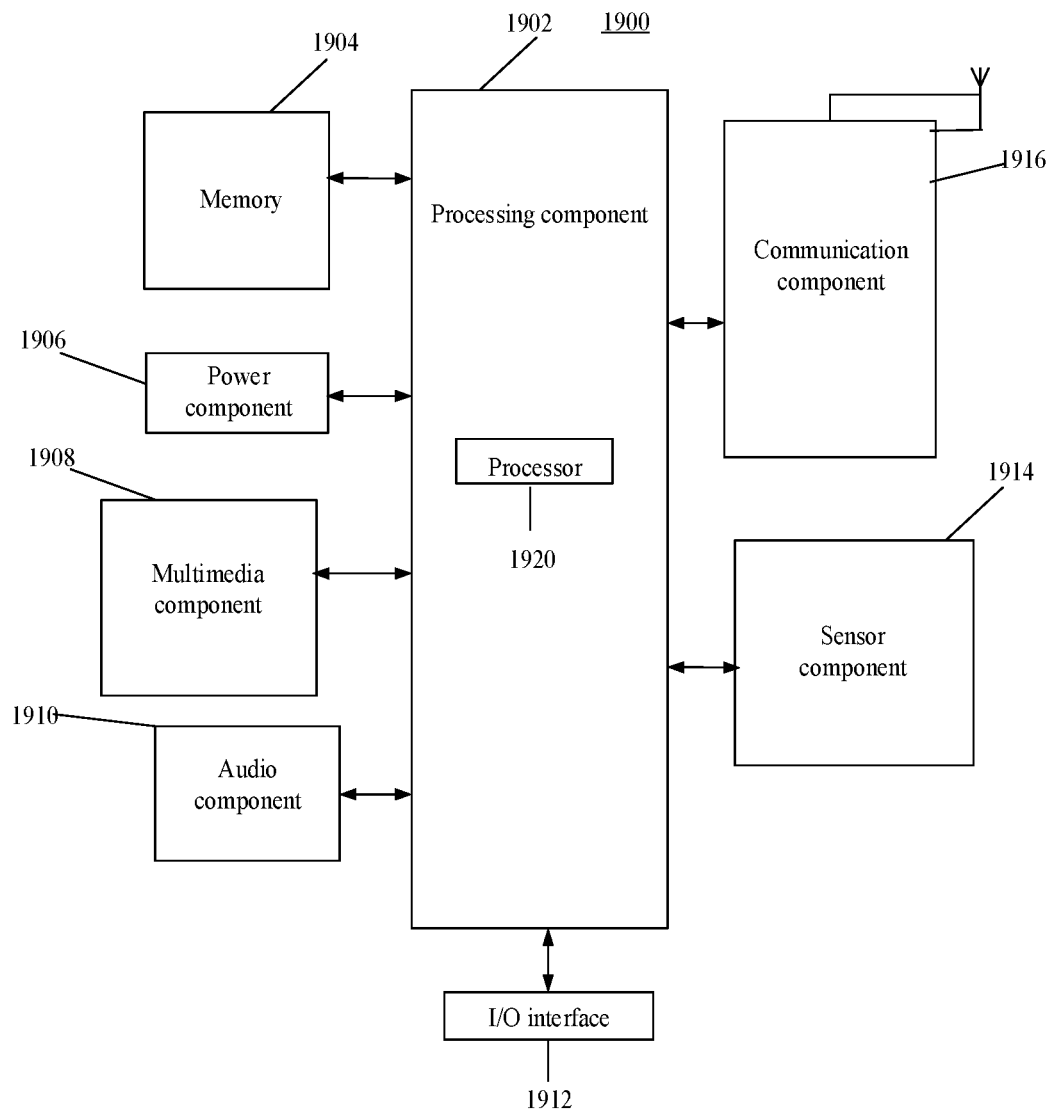
FIG. 19 is a block diagram of a device for displaying information according to some embodiments.

FIG. 19 is a block diagram of a device for displaying information 1900 according to some embodiments. For example, the device 1900 can be a mobile phone, a computer, a digital broadcast terminal, a messaging device, a gaming console, a tablet, a medical device, exercise equipment, a personal digital assistant and the like.

Referring to FIG. 19, the device 1900 can include one or more of the following components: a processing component 1902, a memory 1904, a power component 1906, a multimedia component 1908, an audio component 1910, an Input/Output (I/O) interface 1912, a sensor component 1914, and a communication component 1916.

The processing component 1902 is typically configured to control overall operations of the device 1900, such as the operations associated with display, telephone calls, data communications, camera operations, and recording operations. The processing component 1902 can include one or more processors 1920 to execute instructions to perform all or part of the operations in the abovementioned method. Moreover, the processing component 1902 can further include one or more portions which facilitate interaction between the processing component 1902 and other components. For instance, the processing component 1902 can include a multimedia portion to facilitate interaction between the multimedia component 1908 and the processing component 1902.

The various device components, portions, blocks, or portions may have modular configurations, or are composed of discrete components, but nonetheless can be referred to as "portions" in general. In other words, the "components," "portions," "blocks," "portions," or "portions" referred to herein may or may not be in modular forms.

The memory 1904 is configured to store various types of data to support the operation of the device 1900. Examples of such data include instructions for any applications or methods operated on the device 1900, contact data, phonebook data, messages, pictures, video, etc. The memory 1904 can be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1906 is configured to provide power for various components of the device 1900. The power component 1906 can include a power management system, one or more power supplies, and other components associated with generation, management and distribution of power for the device 1900.

The multimedia component 1908 can include a screen for providing an output interface between the device 1900 and a user. In some examples, the screen can include a Liquid Crystal Display (LCD) and a Touch Panel (TP). In some embodiments, organic light-emitting diode (OLED) or other types of displays can be employed. If the screen includes the TP, the screen can be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 1908 includes a front camera and/or a rear camera. The front camera and/or the rear camera may receive external multimedia data when the device 1900 is in an operation mode, such as a photographing mode or a video mode. Each of the front camera and/or the rear camera may be a fixed optical lens system or have focusing and optical zooming capabilities.

The audio component 1910 is configured to output and/or input an audio signal. For example, the audio component 1910 includes a Microphone (MIC), and the MIC is configured to receive an external audio signal when the device 1900 is in the operation mode, such as a call mode, a recording mode and a voice recognition mode. The received audio signal may further be stored in the memory 1904 or sent through the communication component 1916. In some examples, the audio component 1910 can further include a speaker configured to output the audio signal.

The I/O interface 1912 is configured to provide an interface between the processing component 1902 and a peripheral interface portion, and the peripheral interface portion can be a keyboard, a click wheel, a button and the like. The button may include, but not limited to: a home button, a volume button, a starting button and a locking button.

The sensor component 1914 may include one or more sensors configured to provide status assessment in various aspects for the device 1900. For instance, the sensor component 1914 may detect an on/off status of the device 1900 and relative positioning of components, such as a display and small keyboard of the device 1900, and the sensor component 1914 may further detect a change in a position of the device 1900 or a component of the device 1900, presence or absence of contact between the user and the device 1900, orientation or acceleration/deceleration of the device 1900 and a change in temperature of the device 1900. The sensor component 1914 may include a proximity sensor configured to detect presence of an object nearby without any physical contact. The sensor component 1914 may also include a light sensor, such as a Complementary Metal Oxide Semiconductor (CMOS) or Charge Coupled Device (CCD) image sensor, configured for use in an imaging APP. In some examples, the sensor component 1914 may also include an acceleration sensor, a gyroscope sensor, a magnetic sensor, a pressure sensor or a temperature sensor.

The communication component 1916 is configured to facilitate wired or wireless communication between the device 1900 and other equipment. The device 1900 may access a communication-standard-based wireless network, such as a Wireless Fidelity (Wi-Fi) network, a 2nd-Generation (2G), 3rd-Generation (3G), $4^{th}$-generation (4G), or $5^{th}$-generation (5G) network or a combination thereof. In some embodiments, the communication component 1916 receives a broadcast signal or broadcast associated information from an external broadcast management system through a broadcast channel. In some embodiments, the communication component 1916 further includes a Near Field Communication (NFC) portion to facilitate short-range communication. For example, the NFC portion may be implemented based on a Radio Frequency Identification (RFID) technology, an Infrared Data Association (IrDA) technology, an Ultra-WideBand (UWB) technology, a Bluetooth (BT) technology or another technology.

In some embodiments, the device 1900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In some embodiments, there is also provided a non-transitory computer-readable storage medium having stored an instruction, such as the memory 1904 including an instruction, and the instruction may be executed by the processor 1920 of the device 1900 to implement the abovementioned method. For example, the non-transitory computer-readable storage medium may be a ROM, a Random-Access Memory (RAM), a Compact Disc Read-Only Memory (CD-ROM), a magnetic tape, a floppy disc, an optical data storage device and the like.

Based on a non-transitory computer-readable storage medium, an instruction in the storage medium may be executed by a processor of a mobile terminal to enable the mobile terminal to execute a method for displaying information, the method including that:

first application information of a second application is acquired in a process of displaying a present interface of a first application; and a floating window of the second application is generated according to the first application information of the second application, the floating window of the second application being used to display the first application information of the second application.

Figure 20:
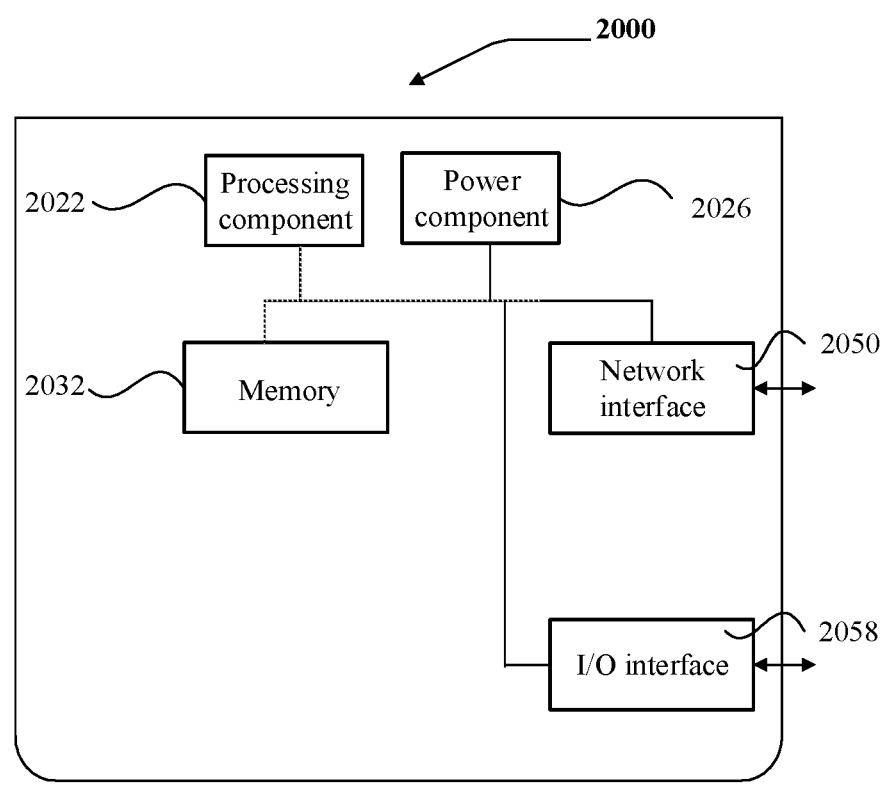
FIG. 20 is a block diagram of a device for displaying information according to some embodiments.

FIG. 20 is a block diagram of a device for displaying information 2000 according to some embodiments. For example, the device 2000 may be provided as a device with a processing capability. Referring to FIG. 20, the device 2000 includes a processing component 2022 further including one or more processors, and a memory resource represented by a memory 2032, configured to store an instruction executable for the processing component 2022, for example, an application. The application stored in the memory 2032 may include one or more than one portion of which each corresponds to a set of instructions. In addition, the processing component 2022 is configured to execute the instruction to execute the abovementioned application processing method.

The device 2000 may further include a power component 2026 configured to execute power management of the device 2000, a wired or wireless network interface 2050 configured to connect the device 2000 to a network and an I/O interface 2058. The device 2000 may be operated based on an operating system stored in the memory 2032, for example, Windows Server™, Max OS X™, Unix™, Linux™, FreeBSD™ or the like.

Other implementation solutions of the present disclosure will be apparent to those skilled in the art from consideration of the specification and practice of the present disclosure. This disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for displaying information, comprising:
during interaction with a first application, a triggering condition based on a threshold preset time has reached, making determination that a tangible service of a second application has not yet been generated from the second application, and creating a service order within the second application;
automatically acquiring first application information of the second application in real time in a process of displaying a present interface of the first application, wherein the first application information indicates status information of the service order; and
generating a floating window of the second application according to the first application information of the second application,
wherein the floating window of the second application is for displaying the first application information of the second application,
wherein said generating the floating window of the second application according to the first application information of the second application comprises:
displaying the server order as a graphical element comprised of at least one of picture and label/topic, text content and time, or name and picture; and
inserting the graphical element into the first application for display to a user as a reminder of the tangible service that is upcoming,
wherein the first application is a content application, and the second application is a service application.

2. The method of claim 1, prior to the generating the floating window of the second application according to the first application information of the second application, the method further comprising:
generating a service pop-up window of the second application according to an application identifier of the second application,
wherein the service pop-up window is for displaying the tangible service to be confirmed in the second application.

3. The method of claim 1, prior to the automatically acquiring the first application information of the second application in real time in the process of displaying the present interface of the first application, the method further comprising:
when the trigger condition is met in the process of displaying the present interface of the first application, displaying the second application on the present interface of the first application;
receiving a first trigger operation over the second application in the first application; and
generating the service pop-up window of the second application.

4. The method of claim 1, wherein said generating the floating window of the second application according to the first application information of the second application comprises:
acquiring present service status information of the second application,
generating the floating window of the second application according to the present service status information; and
displaying the floating window of the second application at a preset position on the present interface of the first application.

5. The method of claim 1, after the generating the floating window of the second application according to the first application information of the second application, the method further comprising:
acquiring second application information of the second application through a preset interface; and
determining whether the second application information is as same as the first application information or not, and
when the second application information is different from the first application information, updating the first application information with the second application information and displaying the second application information in the floating window of the second application.

6. The method of claim 1, after the generating the floating window of the second application according to the first application information of the second application, the method further comprising:
acquiring second application information of the second application through a preset interface;

determining whether the second application information is termination information or not, and when the second application information is the termination information, closing the floating window of the second application.

7. The method of claim 1, further comprising:

acquiring third application information of a third application in the process of displaying the present interface of the first application;

generating a floating window of the third application according to the third application information, wherein the floating window of the third application is for displaying the third application information of the third application; and displaying the floating window of the second application and the floating window of the third application on the present interface of the first application in an overlapping manner, or, alternately displaying the floating window of the second application and the floating window of the third application on the present interface of the first application according to a preset time period.

8. A device for displaying information, comprising:

a processor; and a memory configured to store an instruction executable for the processor, wherein the processor is configured to:

during interaction with a first application, a triggering condition based on a threshold preset time has reached, make determination that a tangible service of a second application has not yet been generated from the second application, and create a service order within the second application;

control automatic acquisition of first application information of the second application in real time in a process of displaying a present interface of the first application, wherein the first application information indicates status information of the service order; and generate a floating window of the second application according to the first application information of the second application, wherein the floating window of the second application is for displaying the first application information of the second application, wherein generating the floating window of the second application according to the first application information of the second application comprises:

displaying the server order as a graphical element comprised of at least one of picture and label/topic, text content and time, or name and picture; and inserting the graphical element into the first application for display to a user as a reminder of the tangible service that is upcoming, wherein the first application is a content application, and the second application is a service application.

9. The device of claim 8, wherein the processor is further configured to:

generate a service pop-up window of the second application according to an application identifier of the second application, wherein the service pop-up window is for displaying the tangible service to be confirmed in the second application.

10. The device of claim 8, wherein the processor is further configured to:

when the trigger condition is met in the process of displaying the present interface of the first application, control displaying of the second application on the present interface of the first application; and control receiving of a first trigger operation over the second application in the first application and generate a service pop-up window of the second application, wherein the service pop-up window is for displaying the service to be confirmed in the second application.

11. The device of claim 8, wherein the processor is further configured to:

control acquisition of present service status information of the second application and generate the floating window of the second application according to the present service status information; and control displaying of the floating window of the second application at a preset position on the present interface of the first application.

12. The device of claim 8, wherein the processor is further configured to:

control acquisition of second application information of the second application through a preset interface; and determine whether the second application information is as same as the first application information or not and, when the second application information is different from the first application information, update the first application information with the second application information and display the second application information in the floating window of the second application.

13. The device of claim 8, wherein the processor is further configured to:

control acquisition of second application information of the second application through a preset interface; and determine whether the second application information is termination information or not and, when the second application information is the termination information, close the floating window of the second application.

14. The device of claim 8, wherein the processor is further configured to:

control acquisition of third application information of a third application in the process of displaying the present interface of the first application;

generate a floating window of the third application according to the third application information, the floating window of the third application being for displaying the third application information of the third application; and control displaying of the floating window of the second application and the floating window of the third application on the present interface of the first application in an overlapping manner or according to a preset time period.

15. A non-transitory computer-readable storage medium having instructions stored thereon for execution by a processor of a mobile terminal to enable the terminal to implement the method of claim 1.

16. The non-transitory computer-readable storage medium of claim 15, wherein the processor further executes the instructions to enable the terminal to implement operations of:

generating a service pop-up window of the second application according to an application identifier of the second application, wherein the service pop-up window is for displaying the tangible service to be confirmed in the second application.

17. The non-transitory computer-readable storage medium of claim 15, wherein the processor further executes the instructions to enable the terminal to implement operations of:
    when the trigger condition is met in the process of displaying the present interface of the first application, displaying the second application on the present interface of the first application;
    receiving a first trigger operation over the second application in the first application; and
    generating the service pop-up window of the second application.

18. The non-transitory computer-readable storage medium of claim 15, wherein
    the processor further executes the instructions to enable the terminal to implement operations of:
        acquiring present service status information of the second application,
        generating the floating window of the second application according to the present service status information; and
        displaying the floating window of the second application at a preset position on the present interface of the first application.

19. The non-transitory computer-readable storage medium of claim 15, wherein the processor further executes the instructions to enable the terminal to implement operations of:
    acquiring second application information of the second application through a preset interface; and
    determining whether the second application information is as same as the first application information or not, and
    in a case that the second application information is different from the first application information, updating the first application information with the second application information and displaying the second application information in the floating window of the second application; or closing the floating window of the second application.

20. A mobile phone implementing the method of claim 1, wherein the mobile phone is configured to coordinate work between applications without a user switching between two types of applications while informing the user statuses of the applications, and the floating window of the second application is configured to float at an edge of the present interface of the first application without triggering the second application.

* * * * *